(12) United States Patent
Aizono et al.

(10) Patent No.: US 8,363,268 B2
(45) Date of Patent: Jan. 29, 2013

(54) PRINTING SYSTEM AND CONTROL METHOD THEREOF AND PROGRAM

(75) Inventors: Keisuke Aizono, Kawasaki (JP); Takeshi Kaneda, Yokohama (JP)

(73) Assignee: Canon Kabushiki Kaisha (JP)

( * ) Notice: Subject to any disclaimer, the term of this patent is extended or adjusted under 35 U.S.C. 154(b) by 1061 days.

(21) Appl. No.: 12/326,534

(22) Filed: Dec. 2, 2008

(65) Prior Publication Data

US 2009/0141297 A1    Jun. 4, 2009

(30) Foreign Application Priority Data

Dec. 4, 2007 (JP) ................... 2007-313950

(51) Int. Cl.
*H04N 1/04* (2006.01)
(52) U.S. Cl. .......... 358/1.9; 358/1.3; 358/1.13; 358/474
(58) Field of Classification Search .................. 358/1.9, 358/1.3, 1.13, 474, 505
See application file for complete search history.

(56) References Cited

U.S. PATENT DOCUMENTS 5,839,019 A * 11/1998 Ito .................................. 399/45
2004/0190057 A1   9/2004 Takahashi et al.

FOREIGN PATENT DOCUMENTS

| JP | 05-212928 | * | 8/1993 |
|---|---|---|---|
| JP | 7-056465 | A | 3/1995 |
| JP | 2002-72775 | A | 3/2002 |
| JP | 2003-063070 | A | 3/2003 |
| JP | 2003-221160 | A | 8/2003 |
| JP | 2006-89176 | A | 4/2006 |

OTHER PUBLICATIONS

Office Action Issued in Corresponding Japanese Patent Application 2007-313950 dated Mar. 19, 2012.
Japanese Office Action for corresponding JP 2007-313950, mail date Jun. 18, 2012.

* cited by examiner

*Primary Examiner* — Houshang Safaipour
(74) *Attorney, Agent, or Firm* — Rossi, Kimms & McDowell LLP (57) ABSTRACT

A printing system and control method thereof which insert partitions between printed materials printed by a printing apparatus execute substitution operation in a case that there is no partition. The substitution operation includes executing shift discharge sheet operation which loads printed materials onto a stacker with a shift by units of printed materials to be partitioned, or supplying an partition for substitution from another sheet feed cassette in which partitions for substitution operation are stored, or supplying a sheet from another sheet feed cassette in which other sheets being different from the printed material used to printing of printed materials in at least one of size, type and color as an partition.

20 Claims, 8 Drawing Sheets

PRINTING SYSTEM AND CONTROL METHOD THEREOF AND PROGRAM

BACKGROUND OF THE INVENTION

1. Field of the Invention

The present invention relates to a printing system configured to be able to supply a partition and a control method thereof and program.

2. Description of the Related Art

In contrast to the conventional printing industry, POD (Print On Demand) printing systems that use electrophotographic method or ink-jet method printing apparatuses have recently been proposed (refer to U.S. Publication No. 2004-0190057). Use of these POD printing systems eliminates the need for an offset plate making process necessary in the conventional printing industry or other complicated operations.

However, there remains room for further examination with regard to practical application of such POD printing systems. For example, a printing system for POD differs from a printing system for an office, and how to continue a printing operation without interrupting the printing operation is important.

On the other hand, in consideration of post-processes, etc., how an operator can efficiently process a large volume of printed material is important. There is a demand for a simultaneous pursuit of increased productivity and improved usability.

Here, at first, as an effective method for improving usability mentioned above, there is proposed, for example, configuring a printing system to be able to partition a large volume of printed material by using interleaves(partitions), etc. However, as a result of building such a printing system, it is possible to run out of interleaves in the middle of creating a plurality of printed materials by a printing system. When these interleaves run out, trouble of operation of the printing system getting backed up occurs.

SUMMARY OF THE INVENTION

An aspect of the present invention is to eliminate the above-mentioned problems with the conventional technology.

An aspect of the present invention is to provide a system and a method to suppress occurrences of the new trouble of operation of the printing system inadvertently getting backed up as a result of partitions running out.

An aspect of the present invention is to provide a system and a method to suppress the occurrence of this new trouble while realizing the simultaneous pursuit of increased productivity and increased usability.

According to an aspect of the present invention, there is provided a printing system comprising: a supply control unit configured to cause a supplying unit to supply a partition for partitioning a plurality of printed materials printed by a printing unit; and a control unit configured to cause substitution means to execute a substitution operation for partition, in a case where there is no partition to be supplied by the supply control unit in the supplying unit.

According to an aspect of the present invention, there is provided a printing system comprising: a printing unit; a plurality of sheet feed cassettes, each configured to store a plurality of sheets; an assignment unit configured to assign a sheet feed cassette of the plurality of sheet feed cassettes as a partition supplier; a designation unit configured to designate a substitution method in a case that there is no sheet in a first sheet feed cassette assigned by the assignment unit; a setting unit configured to set a mode to insert a partition between printed materials printed by the printing unit; a determination unit configured to determine whether or not a sheet is stored in the first sheet feed cassette assigned as the partition supplier by the assignment unit, in a case that the mode is set by the setting unit; and a control unit configured to control so as to, in a case that the determining unit determines that a sheet is stored in the first sheet feed cassette, feed a partition from the first sheet feed cassette at an partition supply timing and insert the partition between the printed materials, and in a case that the determining unit determines that a sheet is not stored in the first sheet feed cassette, feed a sheet as a substitution partition from a sheet feed cassette other than the first sheet feed cassette among the plurality of sheet feed cassettes according to the substitution method at the partition supply timing, or shift a discharge position of the printed materials in a discharge unit at the partition supply timing.

According to an aspect of the present invention, there is provided a control method of a printing system, comprising: causing a supplying unit to supply a partition for partitioning a plurality of printed materials printed by a printing unit; and causing a substitution unit to execute a substitution operation for partition, in a case where there is no partition to be supplied by the supplying unit.

Further features of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
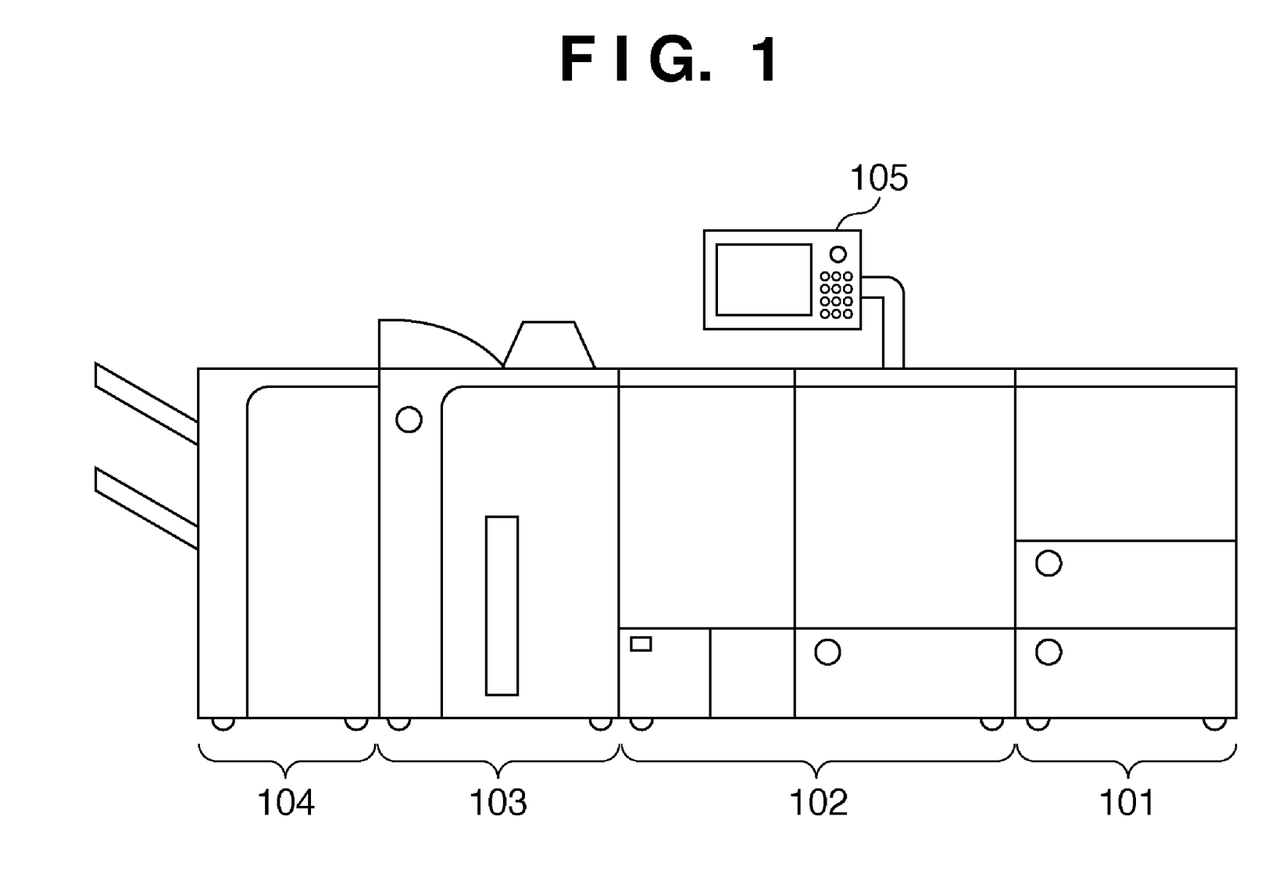
FIG. 1 depicts an overall view of a printing system according to an exemplary embodiment of the present invention.

FIG. 1 depicts an overall view of a printing system according to an exemplary embodiment of the present invention.

This printing system comprises a paper deck (stack tray) 101 that loads and holds a plurality of sheets (printing medium) and provides each sheet to a printing apparatus 102, and the printing apparatus 102 that prints on the provided sheets. A stacker 103 loads and holds sheets printed by the printing apparatus 102. Further, this printing system has a finisher 104 that executes post-processes using post-processing units for sheets printed by the printing apparatus 102. The paper deck 101 has a plurality of sheet feed cassettes, and differently sized sheets can be set on each sheet feed cassette. The stacker 103 can internally store a large volume of printed material printed and discharged by the printing apparatus 102. Further, since those printed materials can be loaded onto a trolley and transported to another location, post-processing, etc., can be easily executed after printing. The finisher 104 can hold a large volume of printed materials (printed sheets) discharged from the printing apparatus 102. Further, for example, the printing system has a shift sort function that changes a discharge sheet location, a stapling function that saddle stitches printed materials together by copy, etc., for easy distinguishing between printed materials printed by one job from printed materials printed by another job. A console unit 105 receives operation commands from a user, and displays messages to the user.

Figure 2:
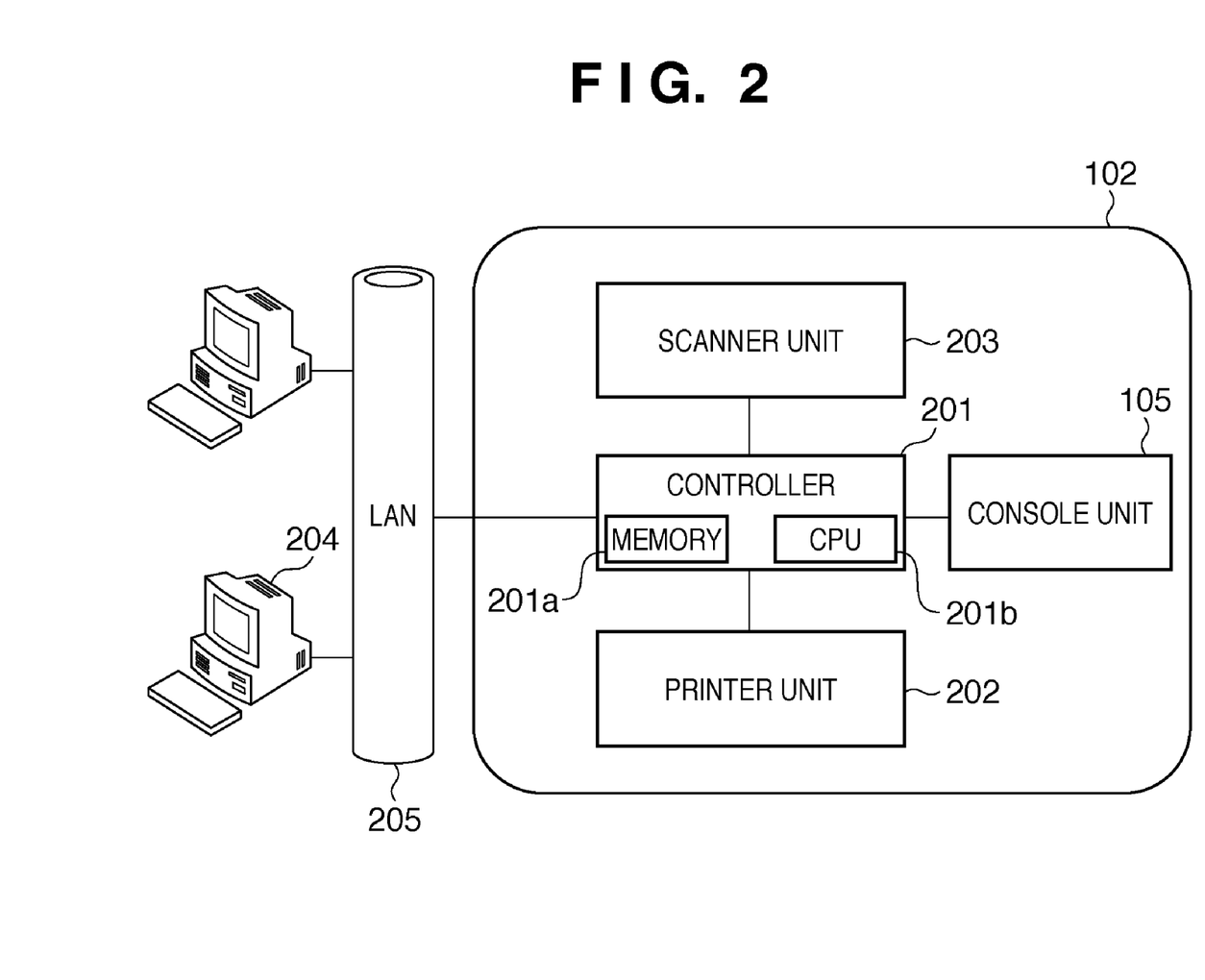
FIG. 2 is a block diagram explaining the composition of a printing apparatus according to the embodiment of the present invention.

FIG. 2 is a block diagram explaining the composition of the printing apparatus according to the embodiment of the present invention.

This printing apparatus 102 has a controller 201, a printer unit 202, a scanner unit 203, etc. Further, the controller 201 is connected to an external PC 201 via a LAN 205, and can receive printing jobs from an external PC 204. Further, a user can give the instruction for copy, etc., by operating the console unit 105 of the printing system 102. The controller 201 has a microcomputer, etc., CPU 201b, and a memory 201a that stores programs for causing the CPU 210b to execute operation of the printing apparatus 102 and other types of data.

First Embodiment

Figure 3:
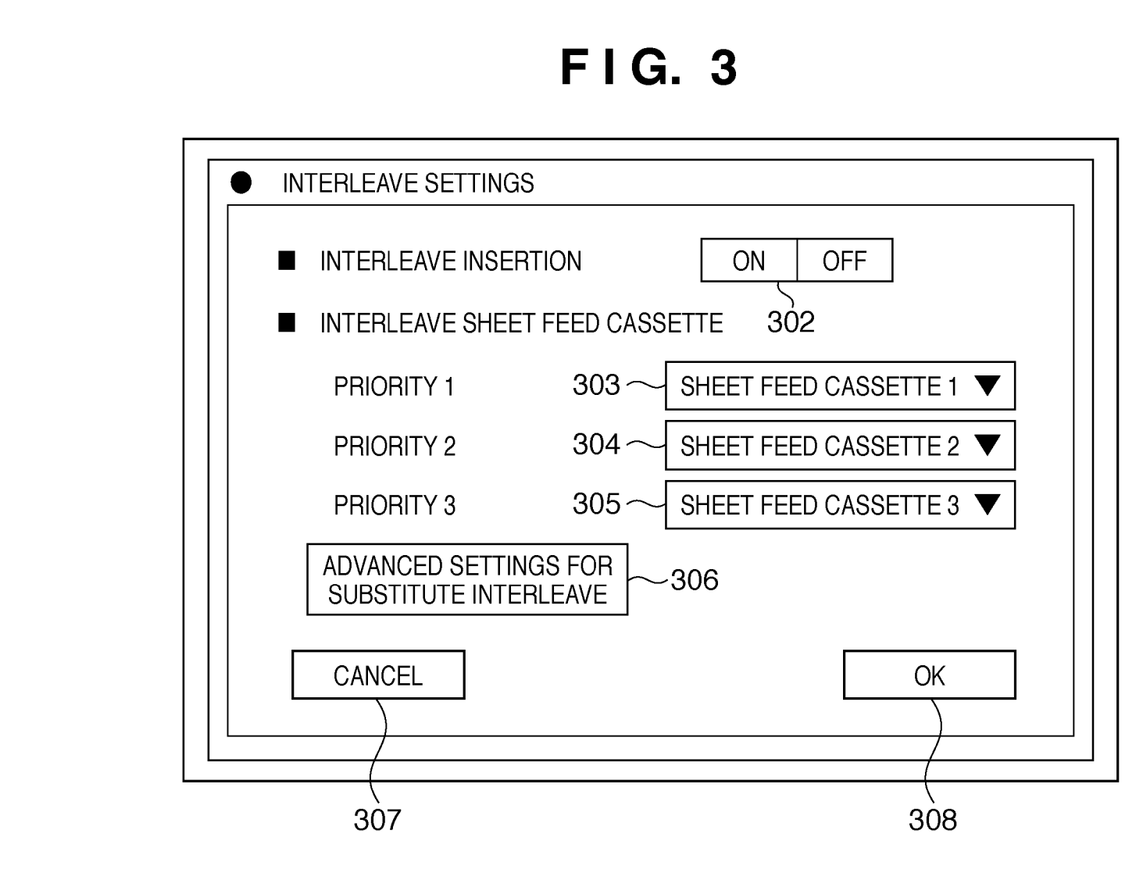
FIG. 3 is a diagram illustrating an example of a screen for setting interleaves on the printing system according to the first embodiment of the present invention.

FIG. 3 is a diagram illustrating an example of a screen for setting interleaves(partitions) on the printing system according to the first embodiment of the present invention. This screen is displayed on the console unit 105.

This printing system can supply an interleave from a sheet feed cassette each time a timing to provide an interleave is reached in the middle of generating a plurality of printed materials, since a plurality of printed materials printed by the printing apparatus can be partitioned into multiple groups by a plurality of interleaves.

Regarding the user interface screen of FIG. 3, when performing settings of interleave, an "interleave insertion" button 302 is turned "ON".

Next, a sheet feed cassette to feed an interleave is chosen from among the "interleave sheet feed cassettes". Here, a sheet feed cassette can be chosen from among the plurality of sheet feed cassettes displayed in buttons 303 to 305. Moreover, the interleave is a specific sheet other than sheets for printing to be printed by the printing apparatus 102 (different type of sheets from the sheets for printing. Incidentally, sheets other than an interleave such as an inserting sheet, etc., are included in the specific sheet. Also, each of the interleaves plays a role of, for example, partitioning a sheet bundle made up of a plurality of printed materials stored in the stacker 103 into multiple groups.

In this first embodiment, a plurality of sheet feed cassettes can be chosen from among the sheet feed cassettes corresponding to the three sheet feed cassette buttons 303-305. Here, priorities are set to the sheet feed cassettes, and interleaves are provided from the plurality of selected sheet feed cassettes in accordance with the priorities. In the example of FIG. 3, "a sheet feed cassette 1" 303 is set with the highest priority. Moreover, this priority has been preset by a user. Then, when an interleave cannot be fed from the indicated sheet feed cassette with a high priority, a sheet feed cassette with a next higher priority is selected as a substitute.

An "advanced setting of substitute interleave" button 306 is a button for setting substitute operation processing when interleaves of the indicated sheet feed cassette have become depleted. Details of this will be given later with reference to FIG. 4. A "cancel" button 307 is a button for canceling items set on this screen. Further, an "OK" button 308 is a button for saving contents set on this screen and causing them to be reflected in subsequent processing.

Figure 4:
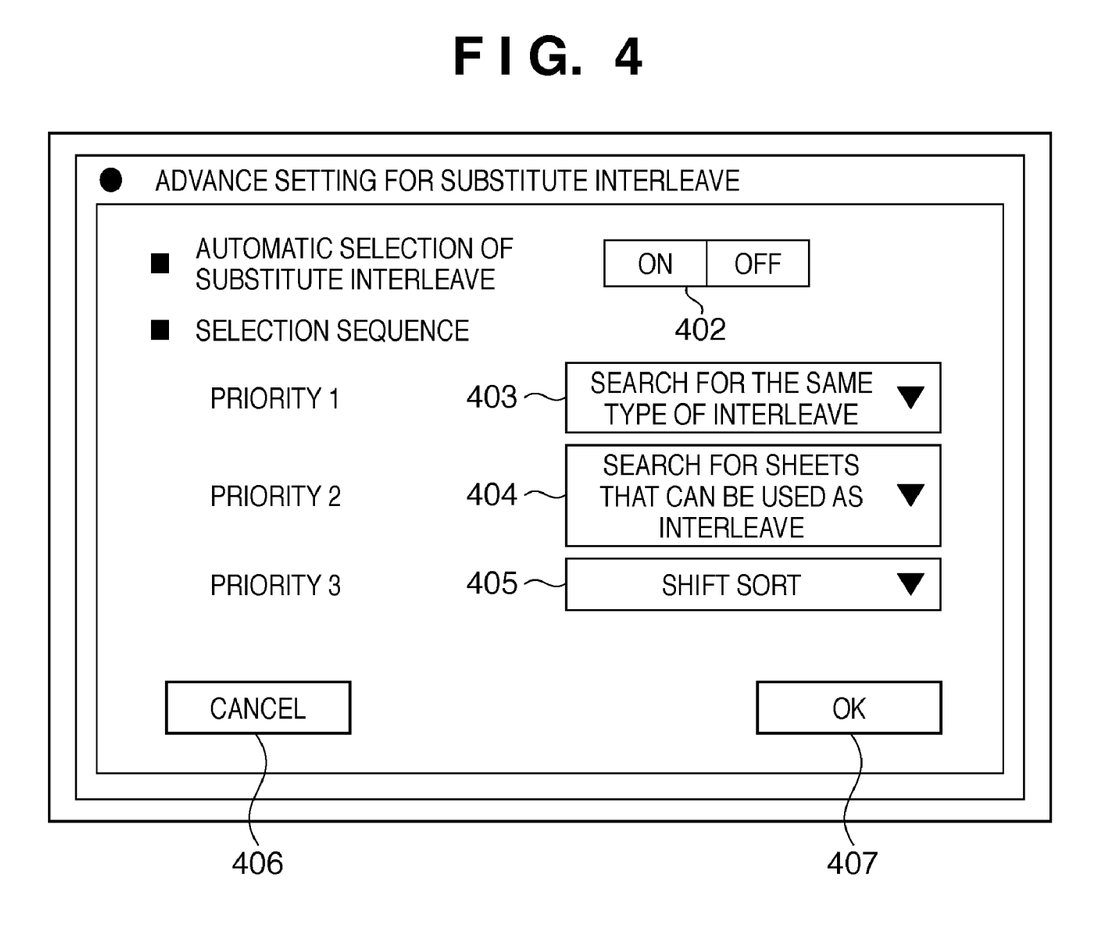
FIG. 4 is a diagram illustrating an example of a screen displayed on a display unit of a console unit when an "advanced settings for substitute interleave" button shown in FIG. 3 is depressed (indicated).

FIG. 4 is a diagram illustrating an example of a screen displayed on a display unit of the console unit 105 when an "advanced settings for substitute interleave" button 306 shown in FIG. 3 is depressed (indicated).

Regarding this advanced settings screen for interleave for substitute operation, by setting "automatic selection of substitute interleave" to "ON" 402, substitute interleaves can be set to be automatically selected. Here, three types of conditions and their priorities can be set.

Reference numeral 403 denotes a button for setting "search for the same type of interleave" as a priority 1 selection sequence. Reference numeral 404 denotes a button for setting "search for sheets that can be used as an interleave" as a priority 2 selection sequence. Further, numeral 405 denotes a button for setting selection of shift sort that loads sheet bundles with a shift without using an interleave as a priority 3 selection sequence. Further, a "cancel" button 406 is a button for canceling items set on this screen. Further, an "OK" button 407 is a button for saving contents set on this screen and causing them to be reflected in subsequent processing. Thus, any of three types of conditions can be selectively executed.

Figure 5:
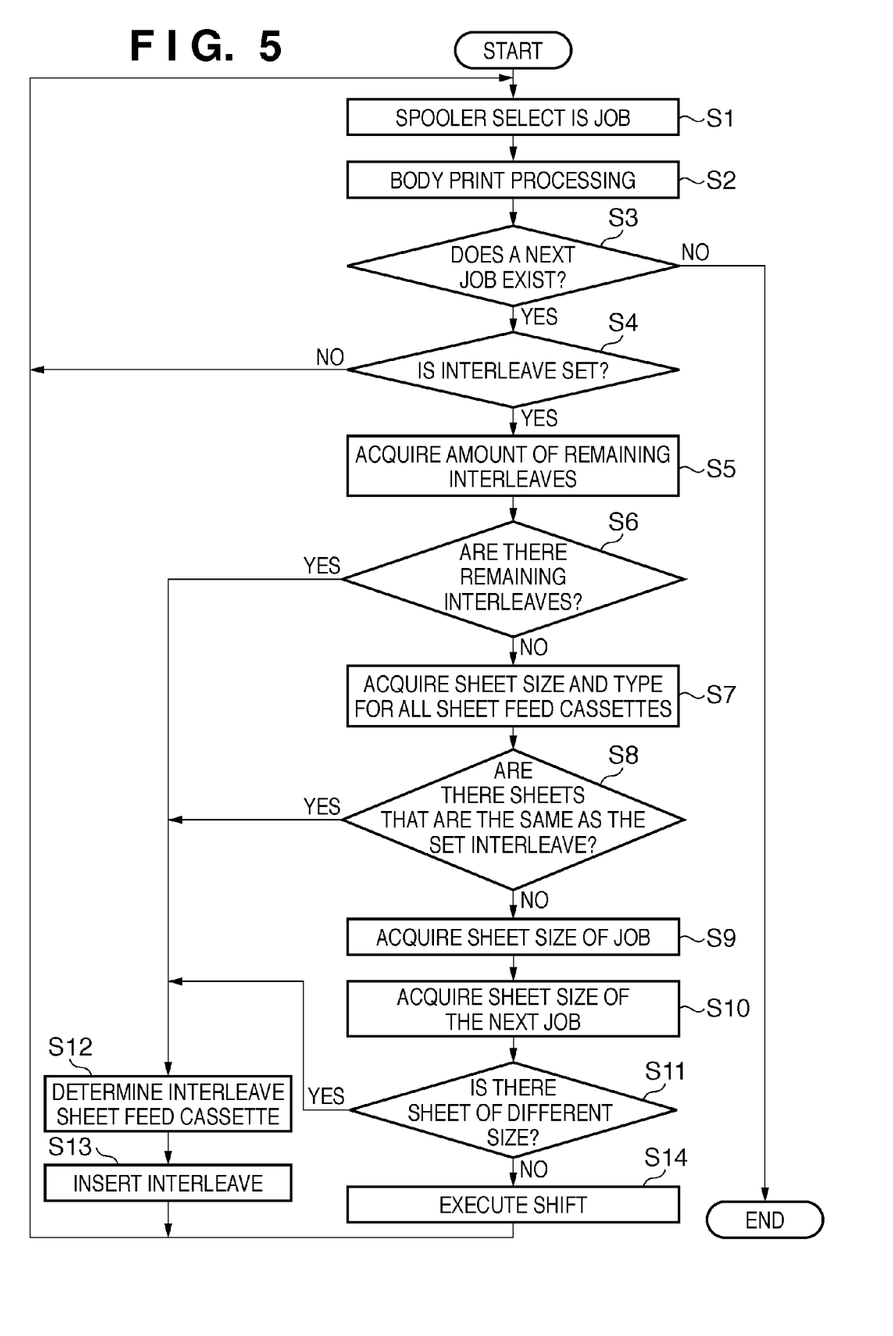
FIG. 5 is a flowchart explaining print job processing for the printing apparatus according to the first embodiment.

FIG. 5 is a flowchart explaining print job processing for a printing apparatus according to the first embodiment. Moreover, a computer executable program that executes this processing is stored in the memory 201a of the controller 201, and is executed by the CPU 201b of this controller 201.

Moreover, an explanation of determining a substitute operation based on a specific sheet size and type will now be given. Further, A3, A4, A5, B3, B4, B5, etc. can be set as sheet sizes, and plain paper, recycled paper, colored paper, cardboard, glossy paper, etc., can be selected as sheet types.

Interleave setting examples and associated state examples for sheet feed cassettes 1-4 are displayed below.

(1) Interleave setting: no interleave setting

| Cassette 1: | A4 | plain paper | remaining |
| Cassette 2: | A4 | cardboard | remaining |
| Cassette 3: | A3 | recycled paper | remaining |
| Cassette 4: | A3 | plain paper | remaining |

(2) Interleave setting: interleave setting exists (sheet feed cassette 3 is set)

| Cassette 1: | A4 | plain paper | remaining |
| Cassette 2: | A4 | cardboard | remaining |

-continued

| Cassette 3: | A3 | recycled paper | remaining |
| Cassette 4: | A3 | plain paper | remaining |

(3) Interleave setting: interleave setting exists (sheet feed cassette 3 is set)

| Cassette 1: | A4 | plain paper | remaining |
| Cassette 2: | A4 | cardboard | remaining |
| Cassette 3: | A3 | recycled paper | none |
| Cassette 4: | A3 | recycled paper | remaining |

(4) Interleave setting: interleave setting exists (sheet feed cassette 3 is set)

| Cassette 1: | A4 | plain paper | remaining |
| Cassette 2: | A4 | cardboard | remaining |
| Cassette 3: | A3 | recycled paper | none |
| Cassette 4: | A3 | colored paper | remaining |

(5) Interleave setting: interleave setting exists (sheet feed cassette 3 is set)

| Cassette 1: | A4 | plain paper | remaining |
| Cassette 2: | A4 | cardboard | remaining |
| Cassette 3: | A3 | recycled paper | none |
| Cassette 4: | A4 | plain paper | remaining |

Processing shown in FIG. 5 is launched when a printing job is put in. First, in step S1, a spooler selects job 1 with a high priority. Next, the process advances to step S2, and printing of the body of the selected job 1 is executed. Then, the process advances to step S3, and it is determined whether or not a next job exists. When it is determined that a next job does not exist, processing is complete, and processing is finished without consideration of interleave settings.

When it is determined that the next job exists in step S3, the process advances to step S4. Here, since a job 2 exists, the process advances to step S4, and it is determined whether there is a setting to insert an interleave between printed sheet bundles of each job. In the case of (1) above, because "no interleave setting" is set, the process returns to step S1, and printing of the next job 2 is initiated.

On the other hand, in the other cases of (2)-(5), because an interleave is set to be inserted the process advances to step S5. In step S5, the amount of remaining interleaves in the sheet feed cassette that stores interleaves is acquired. In the cases of (2)-(5) mentioned above, because sheet feed cassette 3 is set as the interleave sheet feed cassette, the amount of remaining interleaves of this sheet feed cassette 3 is acquired. Next, the process advances to step S6, and it is determined whether or not there are remaining sheets in sheet feed cassette 3. In the case of (2) above, because there are remaining sheets in sheet feed cassette 3, the process advances from step S6 to step S12, and the sheet feed cassette 3 is determined to be the interleave sheet feed cassette. Then, the process advances to step S13, and the interleave determined in step S12 is inserted after the sheet bundle printed in the current job.

In contrast to this, in the cases of (3)-(5), because sheet feed cassette 3 has become "none", it is determined that there are none of the indicated interleaves and the process advances from step S6 to step S7, and processing to select a substitute interleave is started. Here, in step S7, sheet sizes and types stored in all sheet feed cassettes are acquired. Then, the process advances to step S8, and it is determined whether or not there is a sheet feed cassette in which the same type of interleaves as that indicated in sheet feed cassette 3 are stored. In the cases of (3)-(5) above, sheets of sheet feed cassette 3 set to interleave are recycled A4 sheets. Accordingly, in the above case of (3), the process advances from step S8 to step S12, the interleave sheet feed cassette is newly determined to be sheet feed cassette 4. Then, the process advances to step S13, and an interleave from the sheet feed cassette 4 determined in step 12 is inserted after a sheet bundle printed in the current job.

On the other hand, in the cases of (4) and (5) above, a sheet feed cassette other than sheet feed cassette 3 storing recycled paper does not exist. For this reason, the process advances from step S8 to S9, and advances to the next substitute interleave selection.

In step S9, the sheet size of the print job currently being executed is acquired. Currently, the print job currently being executed is job 1, and the sheet feed cassette for job 1 is set to sheet feed cassette 1. In the above cases (1)-(5), A4 size plain sheets are set in sheet feed cassette 1. Accordingly, sheets used for the job 1 currently being executed are A4 size plain sheets. Next, the process advances to step S10, and the sheet size to be used for the next job is acquired. The next job is job 2, and the sheet feed cassette is set to sheet feed cassette 2. In the above cases (1)-(5), A4 size cardboard is set in sheet feed cassette 2. Accordingly, it is known that A4 cardboard sheets will be used for the next job 2. Accordingly, in step S11, it is determined whether or not there exists a sheet feed cassette that stores a sheet size other than the two sheet sizes acquired in step 9 and step 10. In the case of (4) above, sheet feed cassette 4 stores A3 colored paper, which is different from the sheet size (A4) used in the job 1 and job 2, and because there are remaining sheets, this sheet feed cassette 4 is newly determined to be the interleave sheet feed cassette. Further, in the case of (5), because the sheet size of sheet feed cassette 4 is also A4, there is no sheet size that is different from the A4 sheet size of the two jobs. In this case (5), the process advances to step S14, and shift sort processing is executed as a substitute for interleave.

By thus executing step S13 or S14, the process advances to step S1, and printing of the next job is initiated. Then, the processing explained above is repeated until no more jobs remain.

Figure 6:
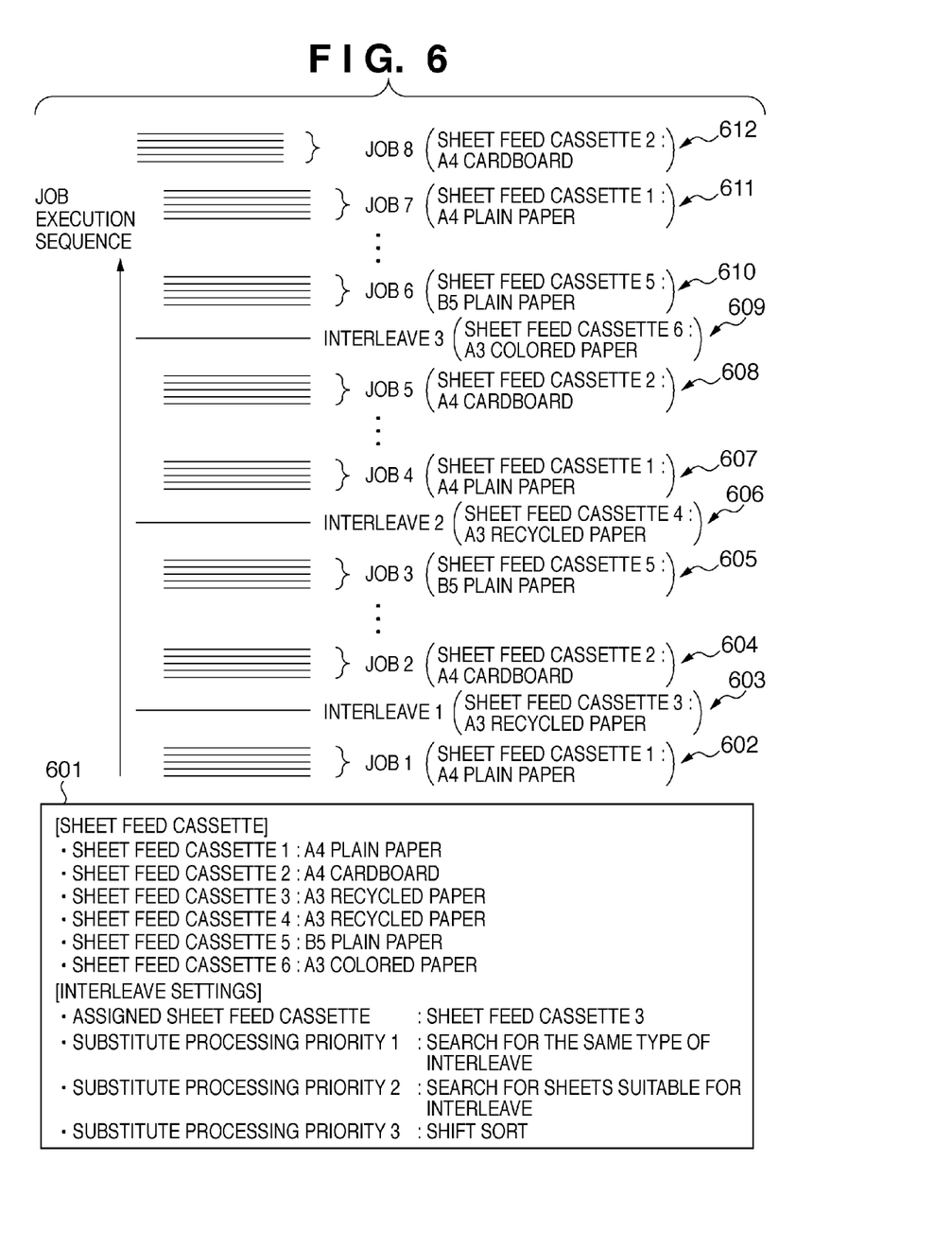
FIG. 6 is a diagram explaining a concrete example of print job processing for the printing system according to the first embodiment.

FIG. 6 is a diagram explaining a concrete example of print job processing for the printing system according to the first embodiment. Here a concrete example of processing according to the previously mentioned flowchart of FIG. 5 will be explained.

Reference numeral 601 denotes a concrete example of setting conditions for an interleave set by a user. Here, sheet feed cassettes 1-6 are assigned as interleave sheet feed cassettes, and each sheet feed cassette stores the sheet shown in reference numeral 601. Further, sheet feed cassette 3 (A3 recycled paper) is assigned as the interleave sheet feed cassette. Further, substitution processing priorities 1-3 are set as substitution operations in the case that a situation occurs in which interleaves of sheet feed cassette 3 are depleted, etc. Here, the substitution operation with priority 1 is "a sheet feed cassette storing the same type of interleave". Further, the substitution operation with priority 2 searches for "a sheet feed cassette storing sheets usable as interleaves" and determines an interleave sheet feed cassette. Further, the substitution operation with priority 3 is set as shift sort. This shift sort is a shift discharge sheet operation that loads printed materials (sheets) onto a loading means (stacker 103) while alternately shifting them in units of partitions of printed materials. Moreover, these setting values are set using a setting screen such as that shown in FIG. 3 and FIG. 4 mentioned above.

Hereinafter, an explanation of processing according to execution sequence of jobs will be given with reference to FIG. 4 and FIG. 6. Moreover, regarding FIG. 6, jobs are executed from bottom to top.

First, it is assumed that interleaves exist in the sheet feed cassette (sheet feed cassette 3) assigned to hold interleaves by a user.

At first, in reference numeral 601, a job 1 is put in, and the job 1 is executed (step S2 of FIG. 5). In this job 1, printing using A4 size plain paper in sheet feed cassette 1 is executed as shown 602 in FIG. 6. Once the job 1 is complete, because the next job 2 exists, the process proceeds to step S4, and it is determined whether or not an interleave is set. Here, because an interleave is set, the process advances to step S5, and the amount of remaining interleaves of the sheet feed cassette set for interleave (here, sheet feed cassette 3) is acquired. Here, because there are remaining interleaves, the process proceeds to from step S6 to step S12, and an A3 recycled paper stored in sheet feed cassette 3 is inserted as an interleave as shown in reference numeral 603 of FIG. 6. Then, after the interleave is thus inserted, processing for printing, etc., of a job 2 of reference numeral 604 is executed next (step S2). This job 2 is executed by printing using A4 size cardboard of sheet feed cassette 2.

Next, and explanation of a case when sheets of the assigned sheet feed cassette (sheet feed cassette 3) become depleted.

In reference numeral 605, a job 3 is inserted, and the job 3 is executed (step S2 of FIG. 5). Here, in the job 3, printing using B5 size plain paper of sheet feed cassette 5 is executed. When this job 3 is complete, because the next job 4 exists the process advances to step S4, and it is determined whether or not interleave is set. Here, because interleave is set, the process advances to step S5, and acquires the remaining interleaves in the sheet feed cassette set for interleave (sheet feed cassette 3). Here, because there are no interleaves in sheet feed cassette 3, the process advances to step S7, and acquires the sheet sizes and types of all sheet feed cassettes. Here, because the substitution operation with the next priority is set as "search for the same type of interleave", a sheet feed cassette storing the same type of sheet as stored in the assigned interleave sheet feed cassette 3 (A3 recycled paper) is searched for. In the example of reference numeral 601, the same type of sheet as A3 recycled paper of sheet feed cassette 3 is stored in sheet feed cassette 4. Accordingly, in step S8 of FIG. 5, it is determined that there is a sheet feed cassette that stores the same type of sheet as the assigned interleave, and the process advances to step S12. Then, as shown in reference numeral 606 of FIG. 6, A3 recycled paper stored in sheet feed cassette 4 is inserted after the printed material of job 3 as an interleave. Then, when the interleave has been inserted, processing for printing, etc., for the next job 4 is executed (step S2) as shown 607 in FIG. 6. In this job 4, printing using A4 size plain paper of sheet feed cassette 1 is executed.

Next, an explanation of a case in which sheets of the assigned sheet feed cassette (here, sheet feed cassette 3) are depleted and the same type of interleave does not exist in other sheet feed cassettes will be given.

In reference numeral 608, a job 5 is put in, and the job 5 is executed (step S2 of FIG. 5). In this job 5, printing using A4 size cardboard of sheet feed cassette 2 is executed. When this job 5 is complete, because the next job 6 exists, the process advances to step S4, and it is determined whether or not interleave is set. Here, because interleave is set, the process advances to step S5, and the amount of remaining interleaves in the sheet feed cassette set to interleave (sheet feed cassette 3) is acquired. Here, because there are no remaining interleaves in sheet feed cassette 3, the process advances to step S7, and the sheet sizes and types of all sheet feed cassettes are acquired. Here, because "search for the same type of interleave" is set as the next priority substitution processing, a sheet feed cassette storing the same type of sheets as stored in the sheet feed cassette 3 assigned in step S8 is searched for. Here, because this is a case in which the sheet feed cassette storing the same type of sheets as those in sheet feed cassette 3 (sheet feed cassette 4) cannot be used, the process advances to step S9, the sheet size and type used in the current job 5 are acquired, and next in step S10, the sheet size and type used in the next job 6 are acquired. Here, the job 5 uses A4 cardboard, and the job 6 uses B5 plain paper. Accordingly, in step S11, it is determined whether there is a sheet feed cassette storing different sheet sizes. In the example of reference numeral 601, A3 colored paper, which has a different size, is stored in sheet feed cassette 6 (sheet feed cassette 3 has no sheets). Accordingly, as shown in reference numeral 609 of FIG. 6, A3 colored paper stored in sheet feed cassette 6 is inserted after the printed material of job 5 as an interleave. Then, when the interleave is thus inserted, processing of printing, etc., of the job 6 is executed next in reference numeral 610 (step S2). In this job 6, printing using B5 plain paper of sheet feed cassette 5 is executed.

Finally, a case in which sheets of the assigned sheet feed cassette (here, sheet feed cassette 3) have been depleted and the same type of interleave does not exist in other sheet feed cassettes, and further there are no sheets that can be used as interleaves will be explained.

In this case, a job 7 (printing A4 plain paper of sheet feed cassette 1) is executed as shown 611 in FIG. 6. When this job 7 is complete, because the next job 8 exists, the process advances to step S4, and it is determined whether or not interleave is set. Here, because interleave is set, the process advances to step S5, and the amount of remaining interleaves for the sheet feed cassette set to interleave (sheet feed cassette 3) is acquired. Here, because there are no remaining interleaves in sheet feed cassette 3, the process advances to step S7, and the sheet sizes and types of all sheet feed cassettes are acquired. Here, because "search for the same type of interleave" is set as the next priority substitution processing, a sheet feed cassette storing the same type of sheets as sheet feed cassette 3 assigned in step S8 is searched for. Here, because the sheet feed cassette storing the same type of sheets as sheet feed cassette 3 (sheet feed cassette 4) cannot be used, the process proceeds to step S9, the sheet size and type used by the current job 5 are acquired, and in the next step S10, the sheet size and type used in the next job 6 are acquired. Here, a job 7 uses A4 plain paper, and a job 8 uses A4 cardboard. Accordingly, in step S11, it is determined whether or not there is a sheet feed cassette storing sheets of a different size (other than A4). Here, because there are no sheets usable as interleaves in any of sheet feed cassette 3 through sheet feed cassette 6, the process advances to step S14. Then, as shown in reference numeral 612, a sheet bundle printed by the job 8 is loaded on top of the sheet bundle printed by the job 7 with a shift (shift sort).

In this way, according to the first embodiment, even when sheets of the sheet feed cassette assigned as the interleave sheet feed cassette are depleted, a sheet feed cassette storing other sheets that can be used as a substitute operation is searched, and interleaves can be fed and inserted from the sheet feed cassette storing those sheets that can be used as a substitute.

Further, when there are no interleaves that can be used as interleaves, shift sort that alternately loads bundles with a shift in units of partitions of printed materials is executed. By this, even when sheets that can be used as interleaves do not exist, sheet bundles that have been printed by each job can be separated and loaded.

Second Embodiment

Moreover, the substitution operation according to the first embodiment mentioned above is permitted when interleaves are used for partitioning a plurality of printed materials printed by a plurality of print jobs by print job.

In contrast to this, in the second embodiment, in the case that interleaves are used to partition a plurality of printed materials created by a single print job by a predetermined number of copies, substitution operation is stopped when there are no interleaves.

Figure 7:
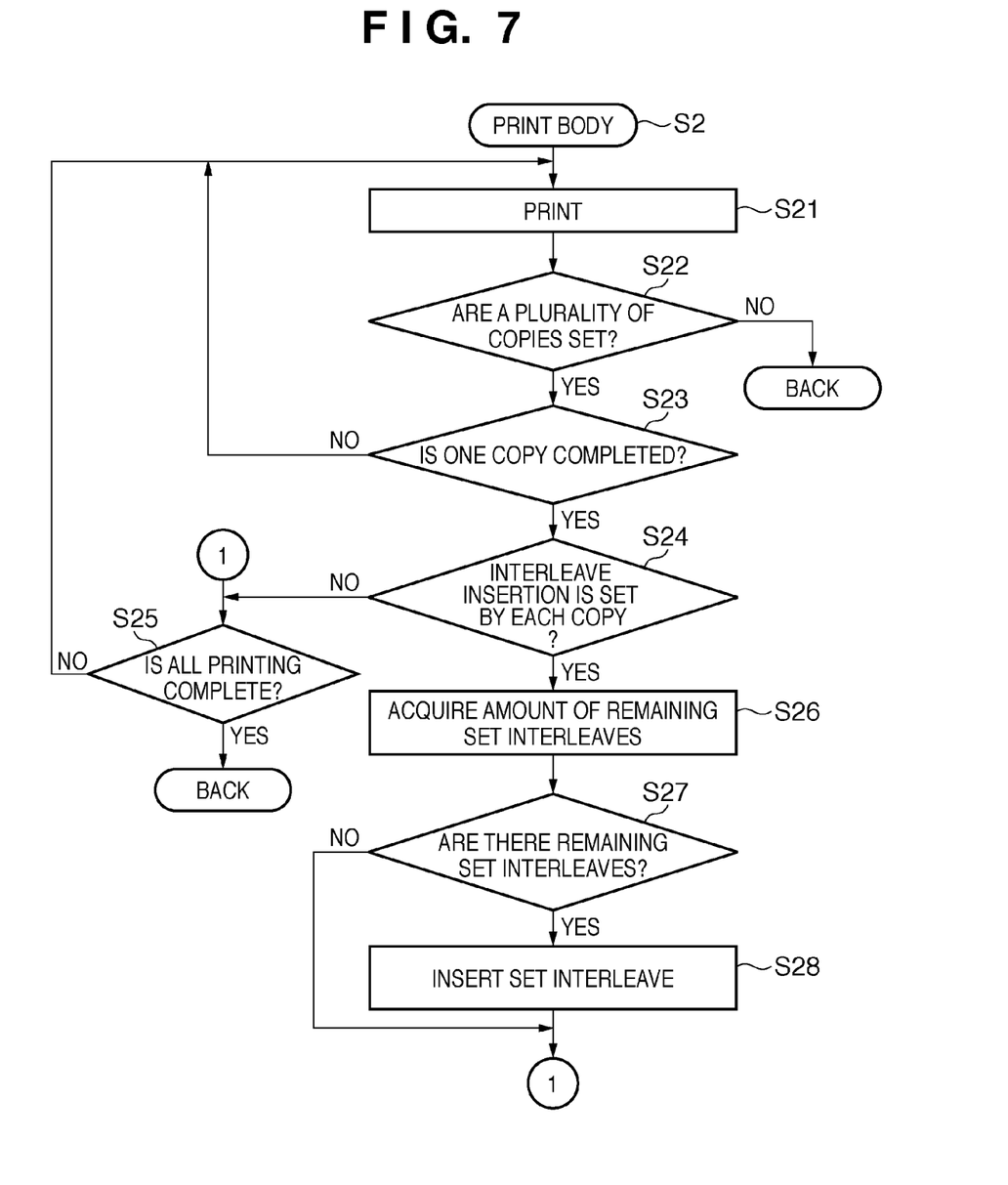
FIG. 7 is a flowchart explaining processing according to the second embodiment of the present invention.

FIG. 7 is a flowchart explaining processing according to the second embodiment of the present invention. Moreover, because the printing system according to this second embodiment has the same printing apparatus hardware configuration as the first embodiment mentioned above, an explanation of this is omitted.

Because the flowchart shown in FIG. 7 operates as a form built into the body print processing of step S2 in the flowchart of FIG. 5, explanations common with the flowchart of FIG. 5 mentioned above are omitted.

In this body print processing, first, print processing based on a job is executed in step S21. Next, in step S22, it is determined whether or not printing of a plurality if copies is set. Here, if it is determined that a plurality of copies is not set, processing is ended as is and the process returns.

In step S22, when it is determined that a plurality of copies is set, the process advances to step S23, and it is determined whether or not one printing copy is complete. When one printing copy is complete, the process advances from step S23 to step S24, and it is determined whether or not interleave insertion for partitioning sheet bundles of each copy is set. This setting can be set by, for example, designing a button to give the instruction to "insert interleaves to partition copies" on the aforementioned screen of FIG. 3. In step S24, if interleave insertion for partitioning each copy is not set, then the processing advances to step S25, and the processing is looped to execute steps S21 through S25 until all set plurality of printing copies are complete.

On the other hand, in step S24, when interleave insertion for partitioning each copy is set, the processing advances to step S26, and in the same manner as the aforementioned step S5 of FIG. 5, the amount of remaining interleaves in the sheet feed cassette set as interleave (sheet feed cassette 3) is acquired. Next, in step S27, in the same manner as step S6, it is determined whether or not there are any remaining set interleaves. If there are remaining interleaves, then the process advances to step S28, interleaves are fed from the set sheet feed cassette, an interleave is inserted after one copy of printed sheet bundles, and the process advances to step S25. On the other hand, in step S27, if it is determined that there are no remaining interleaves in the set sheet feed cassette, then the process advances to step S25 without inserting an interleave.

In this manner, in the case that an interleave is used to partition a plurality of printed materials created by a single print job by a predetermined number of copies, and when there are no interleaves in the sheet feed cassette set as the interleave provider, the substitution operation can be prohibited.

Third Embodiment

Next, in the case that an interleave is used to separate a plurality of printed materials printed by a single print job into single copies, and when there are no interleaves in the sheet feed cassette set to be the interleave provider, substitution operation is not executed. A third embodiment in which creation of printed materials by a printer unit is awaited until interleaves are re-supplied to the sheet feed cassette will be explained.

Figure 8:
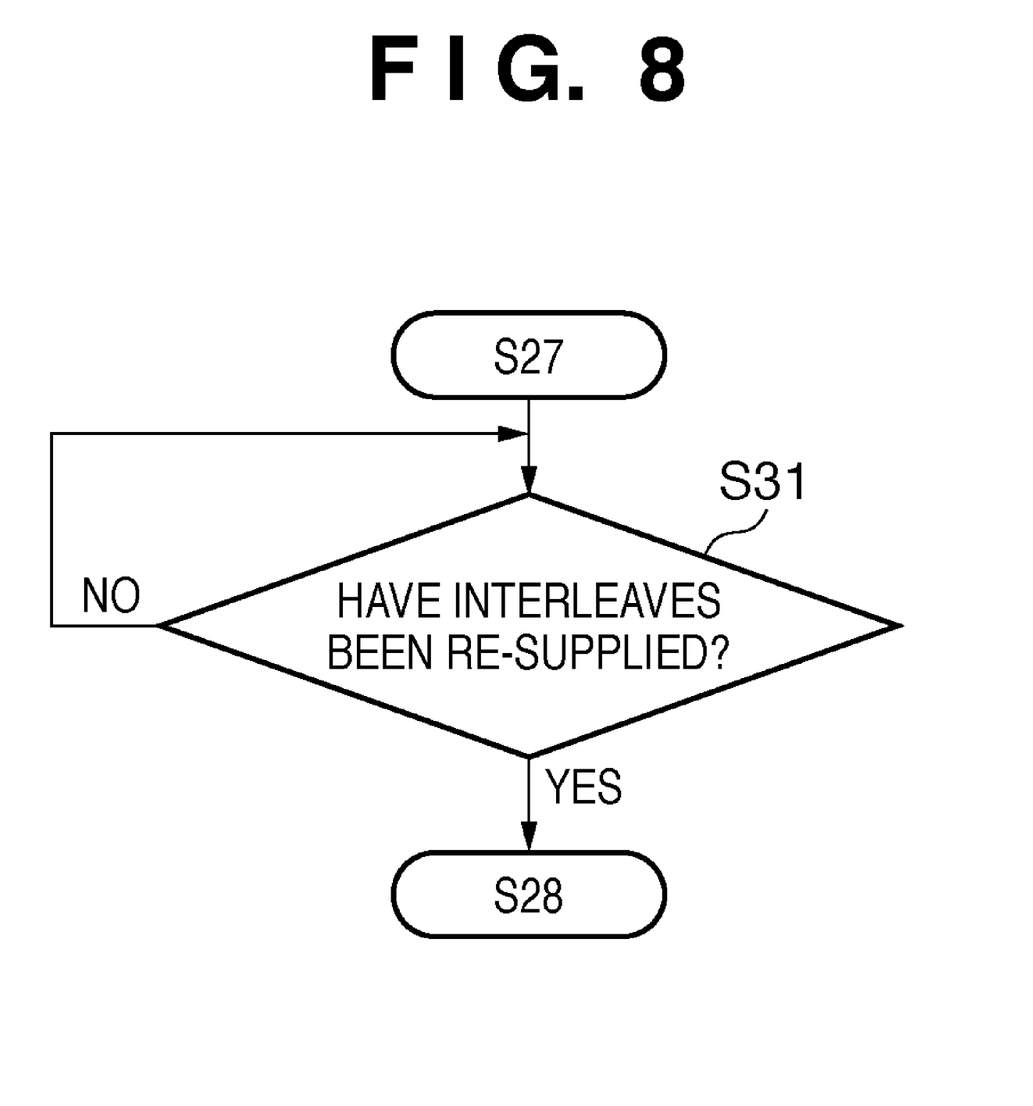
FIG. 8 is a flowchart explaining processing according to the third embodiment of the present invention.

FIG. 8 is a flowchart explaining processing according to the third embodiment of the present invention. This processing is inserted after step S27 in the flowchart of FIG. 7. Moreover, because the printing apparatus hardware configuration of the printing system according to the third embodiment is the same as that of the case of the first embodiment mentioned above, a description thereof will be omitted.

In other words, in step S27 (corresponding to step S6), when it is determined that there are no remaining interleaves in the set sheet feed cassette, the process advances to step S31. Here, it is determined whether interleaves have been replenished to the sheet feed cassette set as the interleave provider (sheet feed cassette 3 of the example mentioned above), and replenishment of interleaves is awaited. Then, when interleaves have been replenished, the process advances to step S28 of FIG. 7, an interleave is inserted after a single copy of printed sheet bundles, and the process advances to step S25.

Thus, according to the third embodiment, when an interleave is set to be inserted at the boundaries of each copy, printing operation is paused when there are no interleaves, and when there are interleaves, insertion of interleaves and printing processing execution is continued. In this manner, interleaves are can be inserted between each copy with certainty.

Moreover, a user can arbitrarily set with which of the second and third embodiments to operate by, for example, designing a button on the advanced settings screen of FIG. 4 mentioned above to give the instruction to "print standby when there are no interleaves" or "ignore interleave insertion when there are no interleaves".

Other Embodiments

The embodiments of the present invention have been described in detail. Note that the present invention can also be achieved by directly or remotely supplying a program of software the implements the functions of the aforementioned embodiments to a system or apparatus, and reading out and executing the supplied program code by a computer of that system or apparatus. In this case, the form of program is not particularly limited as long as it has the program function.

Therefore, the program code itself installed in a computer to implement the functional processing of the present invention using the computer implements the present invention. That is, the claims of the present invention include the computer program itself for implementing the functional processing of the present invention. In this case, the form of program is not particularly limited, and an object code, a program to be executed by an interpreter, script data to be supplied to an OS, and the like may be used as long as they have the program function.

As a recording medium for supplying the program, various media can be used: for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, a program can be supplied by establishing a connection to a home page on the Internet using a browser or a client computer, and downloading the program from the home page to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different home pages. That is, the claims of the preset invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information that decrypts the encrypted program from a home page via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of actual processes on the basis of an instruction of that program, thereby implementing the functions of the aforementioned embodiments.

Furthermore, the program read out from the recording medium may be written in a memory equipped on a function expansion board or a function expansion unit, which is inserted into or connected to the computer. In this case, after the program is written in the memory, a CPU or the like equipped on the function expansion board or unit executes some or all of actual processes based on the instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-313950, filed Dec. 4, 2007, which is hereby incorporated by reference herein in its entirety.

What is claimed is:

1. A printing system comprising:
a feeding control unit configured to cause a sheet feeding unit to feed a sheet as a first type of partition for partitioning a plurality of sheets on which images are printed by a printing unit; and
a control unit configured to perform, in a case where there is no first type of partition in the sheet feeding unit and a first substitution operation can be performed, the first substitution operation, and to perform, in a case where there is no first type of partition in the first feeding unit and the first substitution operation cannot be performed, a second substitution operation which is different from the first substitution operation,
wherein each of the first substitution operation and the second substitution operation is one of:
(1) an operation for causing another sheet feeding unit to feed the first type of partition;
(2) an operation for causing another sheet feeding unit to feed a second type of partition; and
(3) an operation for causing a shift discharge unit to perform shift discharge operation for shifting the sheets in units of sheets to be partitioned.

2. The printing system according to claim 1, wherein the control unit performs, in a case where there is no first type of partition in the sheet feeding unit and the first substitution operation cannot be performed and the second substitution operation cannot be performed, a third substitution operation which is different from the first substitution operation and the second substitution operation, and
wherein the third substitution operation is one of (1) to (3).

3. The printing system according to claim 1, wherein the control unit permits the first substitution operation and the second substitution in a case that the first type of partition is used to partition a plurality of sheets on which images are printed in a plurality of jobs, and prohibits the first substitution operation and the second substitution operation in a case that the first type of partition is used to partition a plurality of sheets on which images are printed in a single print job.

4. The printing system according to claim 1, wherein in a case that the first type of partition is used to partition a plurality of sheets on which images are printed in a plurality of print jobs, the control unit causes the printing unit to continue printing by executing the first substitution operation or the second substitution operation, and in a case that the first type of partition is used to partition a plurality of sheets on which images are printed in a single print job, the control unit causes the printing unit to put on standby of printing until the first type of partition is re-supplied to the sheet feeding without performing the first substitution operation or the second substitution operation.

5. The printing system according to claim 1, wherein the first substitution operation is (1) the operation for causing the another sheet feeding unit to feed the first type of partition, and
wherein the second substitution operation is (2) the operation for causing another sheet feeding unit to feed the second type of partition.

6. The printing system according to claim 1, wherein the control unit performs the first substitution operation or the second substitution operation selected by an operator through a user interface from among (1) to (3).

7. The printing system according to claim 1, wherein the first substitution operation is (1) the operation for causing the another sheet feeding unit to feed the second type of partition, and
wherein the second substitution operation is (3) the operation for causing a shift discharge unit to perform shift discharge operation for shifting the sheets in units of sheets to be partitioned.

8. A printing system comprising:
a printing unit;
a plurality of sheet feed cassettes, each configured to store a plurality of sheets;
an assignment unit configured to assign a sheet feed cassette of the plurality of sheet feed cassettes as a partition supplier;
a designation unit configured to designate a substitution method in a case that there is no sheet in a first sheet feed cassette assigned by the assignment unit;
a setting unit configured to set a mode to insert a partition between printed materials printed by the printing unit;
a determination unit configured to determine whether or not a sheet is stored in the first sheet feed cassette assigned as the partition supplier by the assignment unit, in a case that the mode is set by the setting unit; and a control unit configured to control so as to, in a case that the determining unit determines that a sheet is stored in the first sheet feed cassette, feed a partition from the first sheet feed cassette at a partition supply timing and insert the partition between the printed materials, and in a case that the determining unit determines that a sheet is not stored in the first sheet feed cassette, feed a sheet as a substitution partition from a sheet feed cassette other than the first sheet feed cassette among the plurality of sheet feed cassettes according to the substitution method at the partition supply timing, or shift a discharge position of the printed materials in a discharge unit at the partition supply timing.

9. The printing system according to claim 8, wherein the substitution method includes designation to set a sheet of the same type as those in the first sheet feed cassette as the substitution partition, or to set a sheet having a size being different from printed materials adjacent to an partition to be inserted at the partition supply timing.

10. A printing system according to claim 8, wherein in a case that it is determined that there is no sheet to be used as a substitute partition from among the plurality of sheet feed cassettes, the control unit controls to shift the discharge position of the printed materials at the partition supply timing regardless of the substitution method.

11. A control method of a printing system, comprising:
  causing a sheet feeding unit to feed a first type of partition for partitioning a plurality of sheets on which images are printed by a printing unit;
  performing, in a case where there is no first type of partition in the sheet feeding unit and a first substitution operation can be performed, a first substitution operation; and
  performing, in a case where there is no first type of partition in the first feeding unit and the first substitution operation cannot be performed, a second substitution operation which is different from the first substitution operation,
  wherein each of the first substitution operation and the second substitution operation is one of:
  (1) an operation for causing another sheet feeding unit to feed the first type of partition;
  (2) an operation for causing another sheet feeding unit to feed a second type of partition; and
  (3) an operation for causing a shift discharge unit to perform shift discharge operation for shifting the sheets in units of sheets to be partitioned.

12. The control method according to claim 11, further comprising performing, in a case where there is no first type of partition in the sheet feeding unit and the first substitution operation cannot be performed and the second substitution operation cannot be performed, a third substitution operation which is different from the first substitution operation and the second substitution operation, and
  wherein the third substitution operation is one of (1) to (3).

13. The control method according to claim 11, further comprising permitting the first substitution operation and the second substitution operation in a case that the first type of partition is used to partition a plurality of sheets on which images are printed in a plurality of jobs, and
  prohibiting the first substitution operation and the second substitution operation in a case that the first type of partition is used to partition a plurality of sheets on which images are printed in a single print job.

14. The control method according to claim 11, further comprising:
  causing the printing unit to continue printing by performing the first substitution operation or the second substitution operation in a case that the first type of partition is used to partition a plurality of sheets on which images are printed in a plurality of print jobs, and
  causing the printing unit to put on standby of printing until the first type of partition is re-supplied to the first feeding unit without executing the first substitution operation or the second substitution operation.

15. The control method according to claim 11, wherein the first substitution operation is (1) the operation for causing the another sheet feeding unit to feed the first type of partition, and
  wherein the second substitution operation is (2) the operation for causing another sheet feeding unit to feed the second type of partition.

16. The control method according to claim 11, wherein the first substitution operation or the second substitution operation selected by an operator through a user interface from among (1) to (3) is performed.

17. The control method according to claim 11, wherein the first substitution operation is (1) the operation for causing the another sheet feeding unit to feed the second type of partition, and
  wherein the second substitution operation is (3) the operation for causing a shift discharge unit to perform shift discharge operation for shifting the sheets in units of sheets to be partitioned.

18. A non-transitory computer-readable storage medium for storing a computer executable program for causing a computer to execute a control method of a printing system, the control method comprising:
  causing a sheet feeding unit to feed a first type of partition for partitioning a plurality of sheets on which images are printed by a printing unit;
  performing, in a case where there is no first type of partition in the sheet feeding unit and a first substitution operation can be performed, a first substitution operation; and
  performing, in a case where there is no first type of partition in the first feeding unit and the first substitution operation cannot be performed, a second substitution operation which is different from the first substitution operation,
  wherein each of the first substitution operation and the second substitution operation is one of:
  (1) an operation for causing another sheet feeding unit to feed the first type of partition;
  (2) an operation for causing another sheet feeding unit to feed a second type of partition; and
  (3) an operation for causing a shift discharge unit to perform shift discharge operation for shifting the sheets in units of sheets to be partitioned.

19. The printing system according to claim 1, wherein second type of partition is a sheet of which size is different from the sheets or a sheet of which color is different from the sheets.

20. The control method according to claim 11, wherein second type of partition is a sheet of which size is different from the sheets or a sheet of which color is different from the sheets.

* * * * *